United States Patent [19]

Morisawa

[11] Patent Number: 5,933,548

[45] Date of Patent: *Aug. 3, 1999

[54] IMAGE RETRIEVAL APPARATUS

[75] Inventor: Akira Morisawa, Ichikawa, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/629,079

[22] Filed: Apr. 8, 1996

Related U.S. Application Data

[63] Continuation of application No. 08/214,622, Mar. 18, 1994, abandoned.

[30] Foreign Application Priority Data

Mar. 25, 1993 [JP] Japan .................................. 5-090656

[51] Int. Cl.⁶ .................................................. G06K 9/54
[52] U.S. Cl. .......................................... 382/305; 382/306
[58] Field of Search .................................... 382/306, 305, 382/282; 358/453, 403; 345/146; 395/350, 353

[56] References Cited

U.S. PATENT DOCUMENTS

| | | | |
|---|---|---|---|
| 4,408,181 | 10/1983 | Nakayama | 382/61 |
| 4,555,803 | 11/1985 | Hirose | 358/335 |
| 4,748,678 | 5/1988 | Takeda et al. | 364/518 |
| 4,797,946 | 1/1989 | Katsuta et al. | 382/306 |
| 5,129,011 | 7/1992 | Nishikawa et al. | 382/9 |
| 5,129,016 | 7/1992 | Murakami et al. | 382/61 |
| 5,172,245 | 12/1992 | Kita et al. | 358/403 |
| 5,222,157 | 6/1993 | Yoneda et al. | 382/306 |
| 5,247,591 | 9/1993 | Baran | 382/61 |
| 5,255,104 | 10/1993 | Kajigaya | 358/403 |
| 5,287,497 | 2/1994 | Behera | 382/305 |
| 5,384,785 | 1/1995 | Yoda | 382/305 |
| 5,572,726 | 11/1996 | Hasuo | 382/306 |

OTHER PUBLICATIONS

Gorsline, George W. *Computer Organization*, p. 541, Prentice–Hall, Inc (1986).

*Primary Examiner*—Yon J. Couso
*Attorney, Agent, or Firm*—Fitzpatrick, Cella, Harper & Scinto

[57] ABSTRACT

An image retrieving apparatus for retrieving a first image by a second image associated with the first image, comprises a read unit for reading a plurality of images on a sheet, a discriminating unit for discriminating the images on the sheet read by the read unit as second images, and a storage unit for storing the second images discriminated by the discrimination unit in a storage medium.

9 Claims, 15 Drawing Sheets

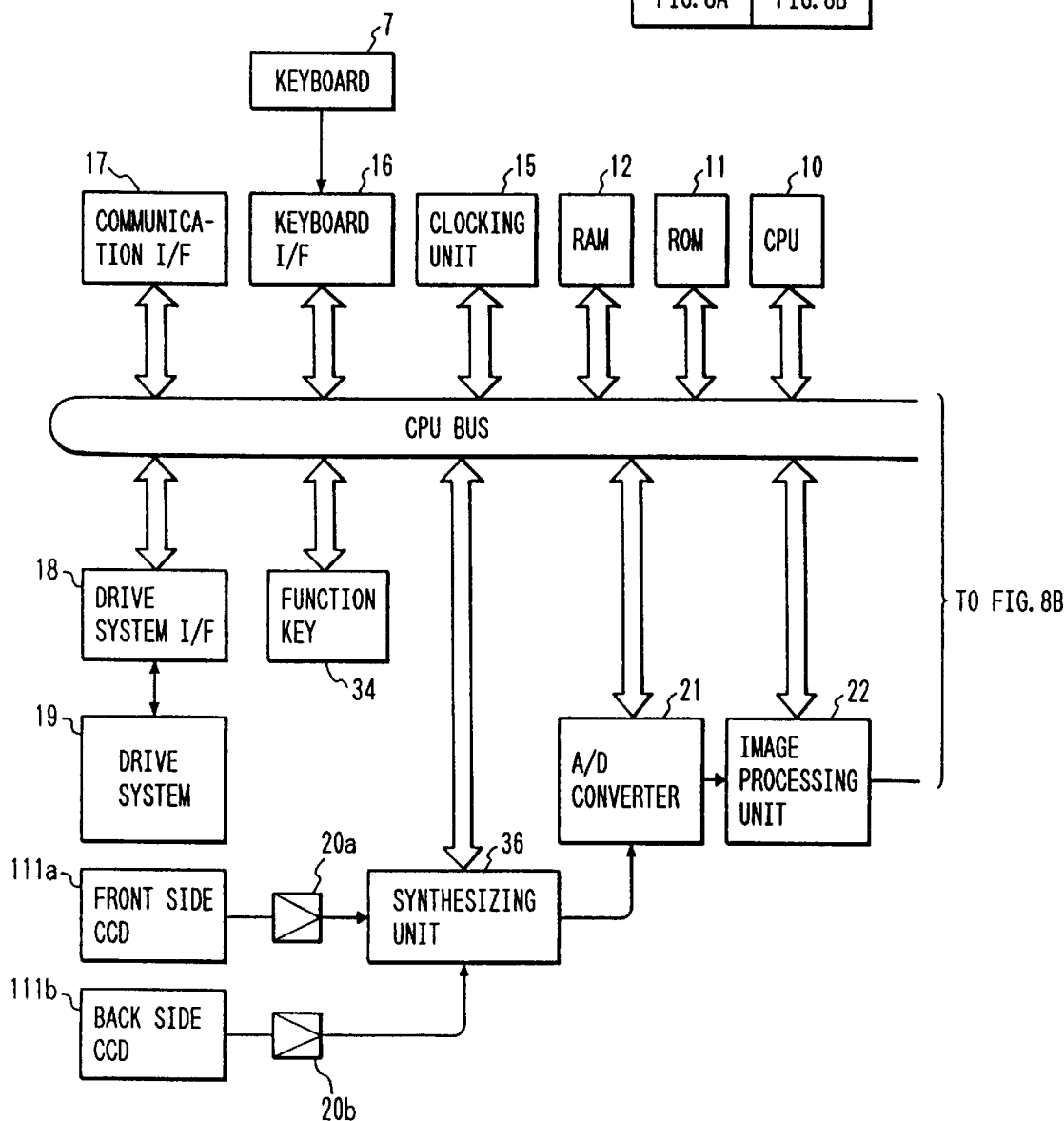

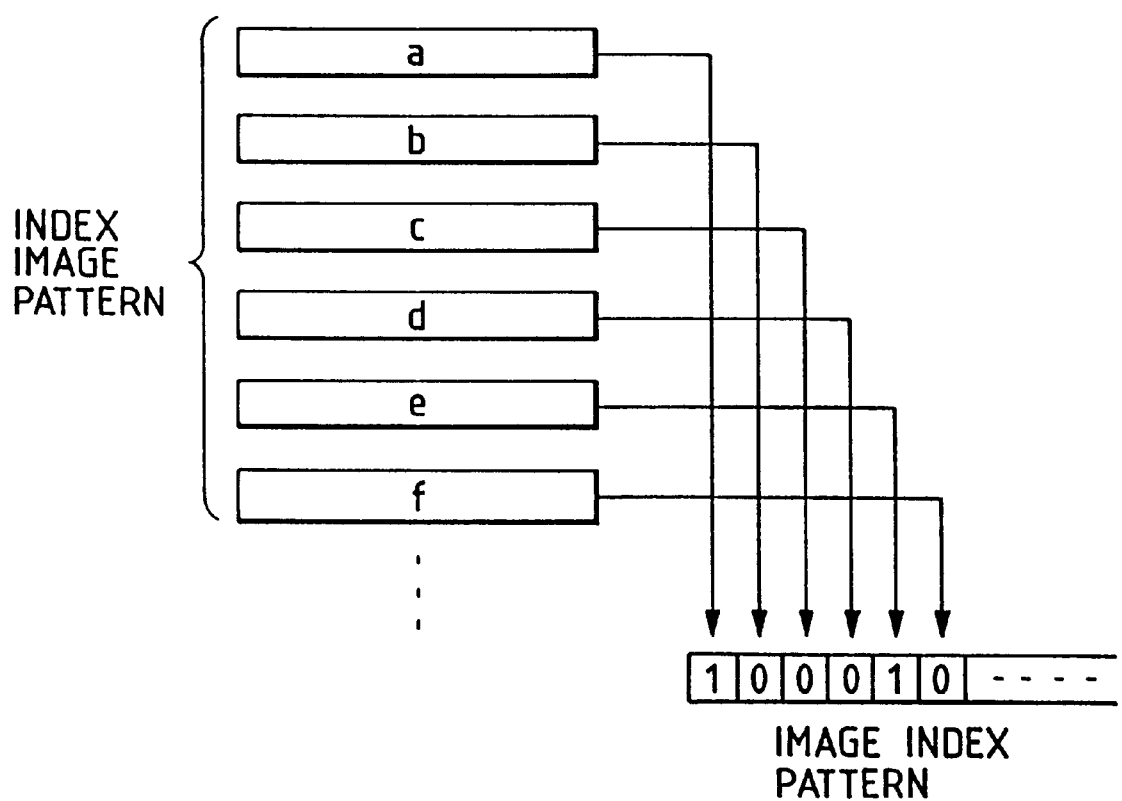

FIG. 12A

DOCUMENT MANAGEMENT FILE

| DELETION | IMAGE INDEX PATTERN | KEY WORD | KEY NO. | PREPARATION DATE | UPDATING DATE | TOTAL PAGE NUMBER | PAGE FILE POINTER |
|---|---|---|---|---|---|---|---|
| 1 | 100100····· | PARTS CATALOG | 337 | 91.05.02 | 92.01.08 | 3 | 1 |
| 1 | 100010····· | PARTS DRAWING | 150 | 92.02.05 | 92.03.20 | 2 | 4 |
| ⋮ | ⋮ | ⋮ | ⋮ | ⋮ | ⋮ | ⋮ | ⋮ |
| 0 | 01000 ····· | REPORT | 110 | 90.01.25 | 90.01.26 | 2 | 8 |
| 1 | 100010····· | PARTS DRAWING | 151 | 92.02.07 | 92.03.21 | 2 | 10 |
| ⋮ | ⋮ | ⋮ | ⋮ | ⋮ | ⋮ | | |

FIG. 12B

PAGE MANAGEMENT FILE

| | DELETION | DISLAY MODE | OTHER IMAGE INFORMATION | NODE |
|---|---|---|---|---|
| 1 | 1 | ONE SIDE | ~ | 5 |
| 2 | 1 | ONE SIDE | ~ | 6 |
| 3 | 1 | ONE SIDE | ~ | 7 |
| 4 | 1 | BOTH SIDES | ~ | 12 |
| 5 | 1 | BOTH SIDES | ~ | 13 |
| ⋮ | ⋮ | ⋮ | ⋮ | ⋮ |
| 8 | 0 | ONE SIDE | ~ | 1 |
| 9 | 0 | ONE SIDE | ~ | 2 |
| 10 | 1 | BOTH SIDES-FRONT | ~ | 20 |
| 11 | 1 | BOTH SIDES-BACK | ~ | 20 |
| ⋮ | ⋮ | ⋮ | | |

FIG. 12C

NODE TABLE

| | DATA SIZE | FAT ENTRY |
|---|---|---|
| 1 | 87654 | 2386 |
| 2 | 56789 | 3342 |
| ⋮ | ⋮ | ⋮ |
| 5 | 76543 | 5658 |
| 6 | 23599 | 56A0 |
| 7 | 98765 | 570C |
| ⋮ | ⋮ | ⋮ |
| 12 | 89765 | 62B0 |
| 13 | 98752 | 632B |
| ⋮ | ⋮ | ⋮ |
| 20 | 87875 | 5086 |

| CLUSTER NO. | PHYSICAL ADDRESS | |
| --- | --- | --- |
| | TRACK NO. | SECTOR NO. |
| 0 | 0 | 1 ~ 8 |
| 1 | 0 | 9 ~ 16 |
| 2 | 1 | 1 ~ 8 |
| ⋮ | ⋮ | ⋮ |

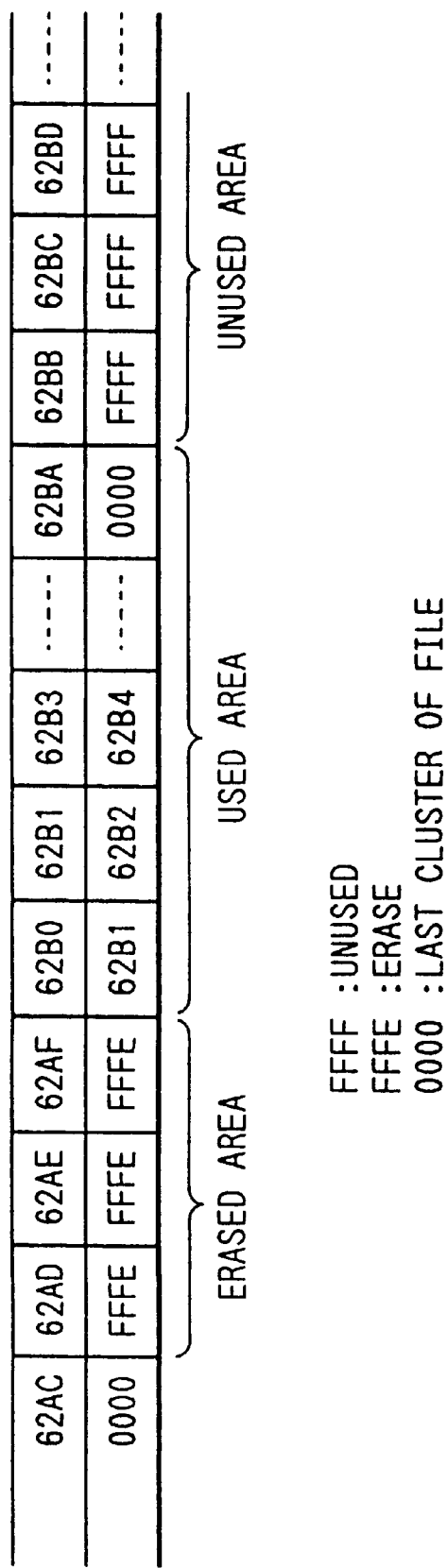

IMAGE RETRIEVAL APPARATUS

This application is a continuation of application Ser. No. 08/214,622 filed Mar. 18, 1994, now abandoned.

BACKGROUND OF THE INVENTION

1. Field of the Invention

The present invention relates to an image retrieval apparatus for retrieving a first image by a second image associated with the first image.

2. Related Background Art

An image retrieval apparatus has recently been proposed in which an image stored in a magneto-optical disk is retrieved by displaying an index image associated with the target image for the selection by an operator.

In the proposed image retrieval apparatus, a sheet having an index image drawn thereon is read to store the index image.

When a number of index images are to be registered or modified, however, it is troublesome to the operator.

SUMMARY OF THE INVENTION

It is another object of the present invention to provide an image retrieval apparatus which allows efficient registration and modification of images to be used for the retrieval.

Other objects and features of the present invention will be apparent from the following description of the invention and the accompanying drawings.

BRIEF DESCRIPTION OF THE DRAWINGS

FIG. 11 shows a configuration for generating an image index pattern based on the index image data.

FIGS. 12A, 12B and 12C show a document management file, a page management table and a node table.

FIG. 15 shows a FAT (file allocation table).

DETAILED DESCRIPTION OF THE PREFERRED EMBODIMENTS

Figure 6:
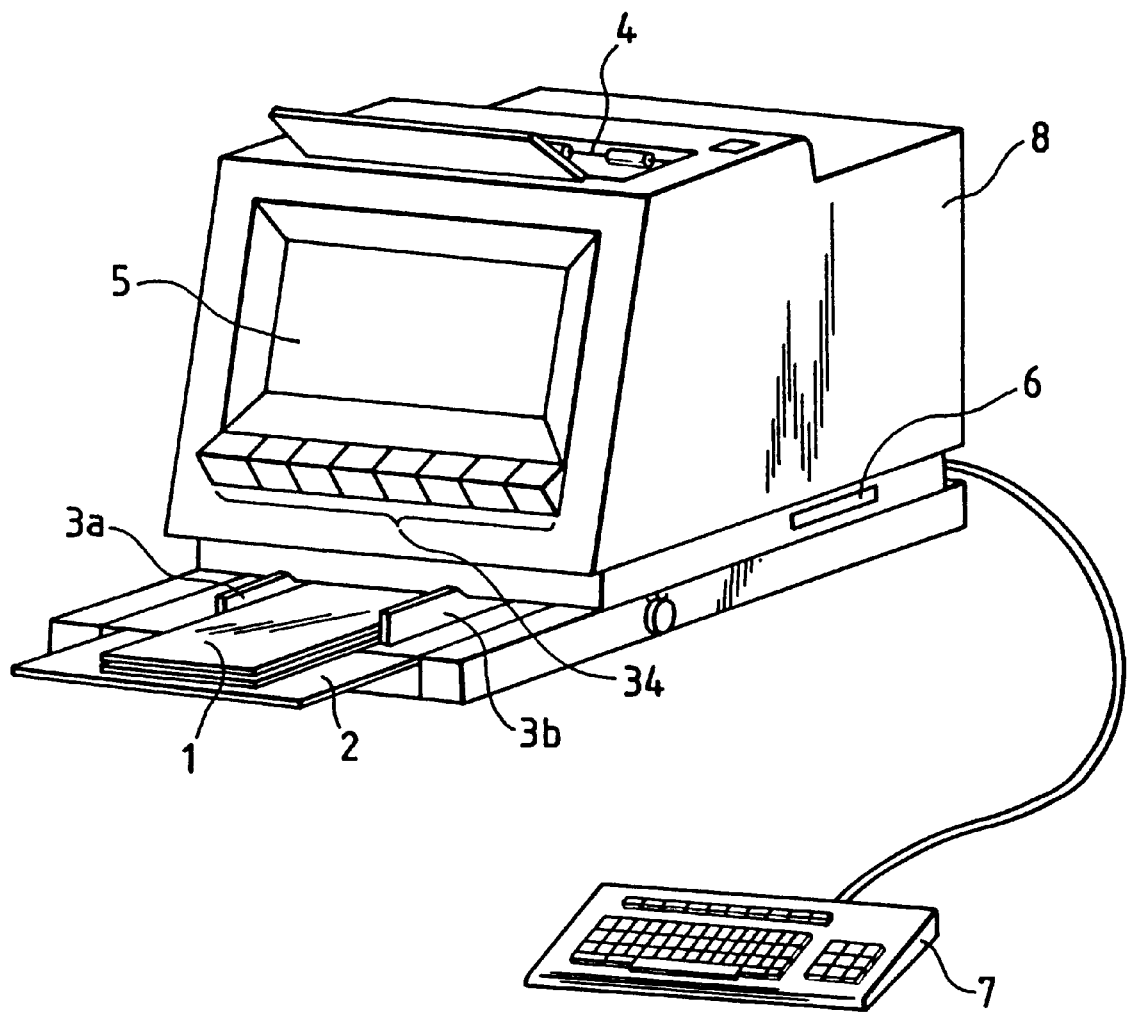
FIG. 6 shows a perspective view of an external view of an image information processing apparatus.
Figure 7:
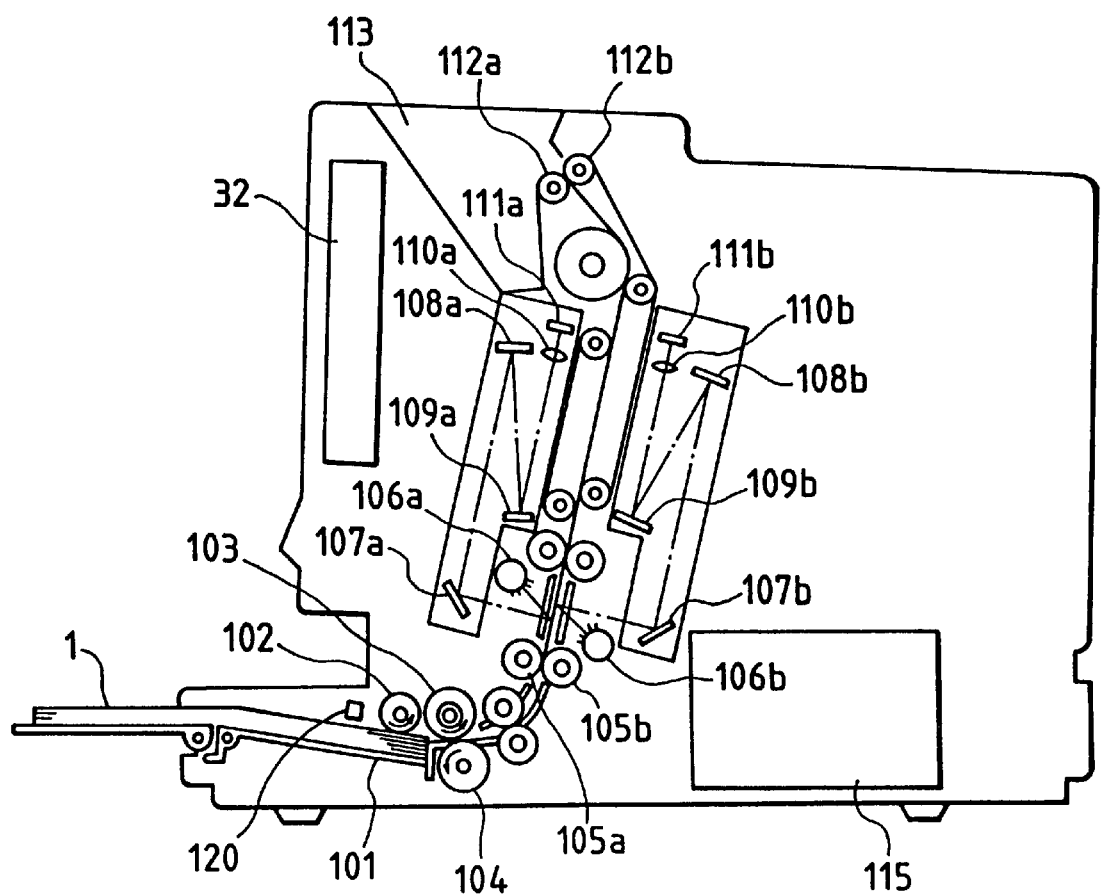
FIG. 7 is a sectional view for showing an internal construction of the image information processing apparatus.

Referring to FIGS. 6 to 15, an embodiment of an image information processing apparatus of the present invention is explained. FIG. 6 is a perspective view showing an external view of the image information processing apparatus, and FIG. 7 is a sectional view showing an internal construction of the image information processing apparatus. FIGS. 8A and 8B show block diagrams of a configuration of a control unit of the image information processing apparatus.

In FIG. 6, a sheet bearing images to be stored is mounted on a sheet table 2 at a bottom of the apparatus while it is guided by defining plates 3a and 3b which define the transport thereof. After the store of the images, the sheet 1 is ejected to a sheet ejection unit 4 at a top of the apparatus. A screen 5 for displaying an image or console instructions is provided on a front of the apparatus. An insertion slot 6 through which a magneto-optical disk 35 is inserted is provided on a side of the apparatus. A keyboard 7 for entering a key word in retrieving an image is connected to the apparatus.

When an image on the sheet 1 is to be stored, the sheet 1 is mounted on the sheet table 2 and a store instruction is issued through the keyboard 7 so that the feed of the sheet is started.

In FIG. 7, a feed roller 102 is initially rotated in a direction of an arrow to feed the sheet to a separation unit. The separation unit comprises a sheet feed roller 103 and a separation roller 104 which are rotated counterclockwise. A top sheet of a bundle of sheets is fed while the lower sheets are left by a gap between the sheet feed roller 103 and the separation roller 104 a frictional force with the separation roller 104.

The sheet fed ahead is then fed by a transport roller 105 and reaches a read unit where image information of the sheet illuminated by an illumination lamp 106 is focused by a lens 110 through mirrors 107–109 and read by a CCD 111. Both sides of the sheet can be simultaneously read as shown by 106a–111a and 106b–111b.

After the reading, the sheet is ejected by an ejection roller 112 and stacked on an ejection tray 114.

The above process is carried out on a continuous basis and terminated when a sheet sensor 102 detects that there is no sheet on the sheet table 2.

Figure 8B:
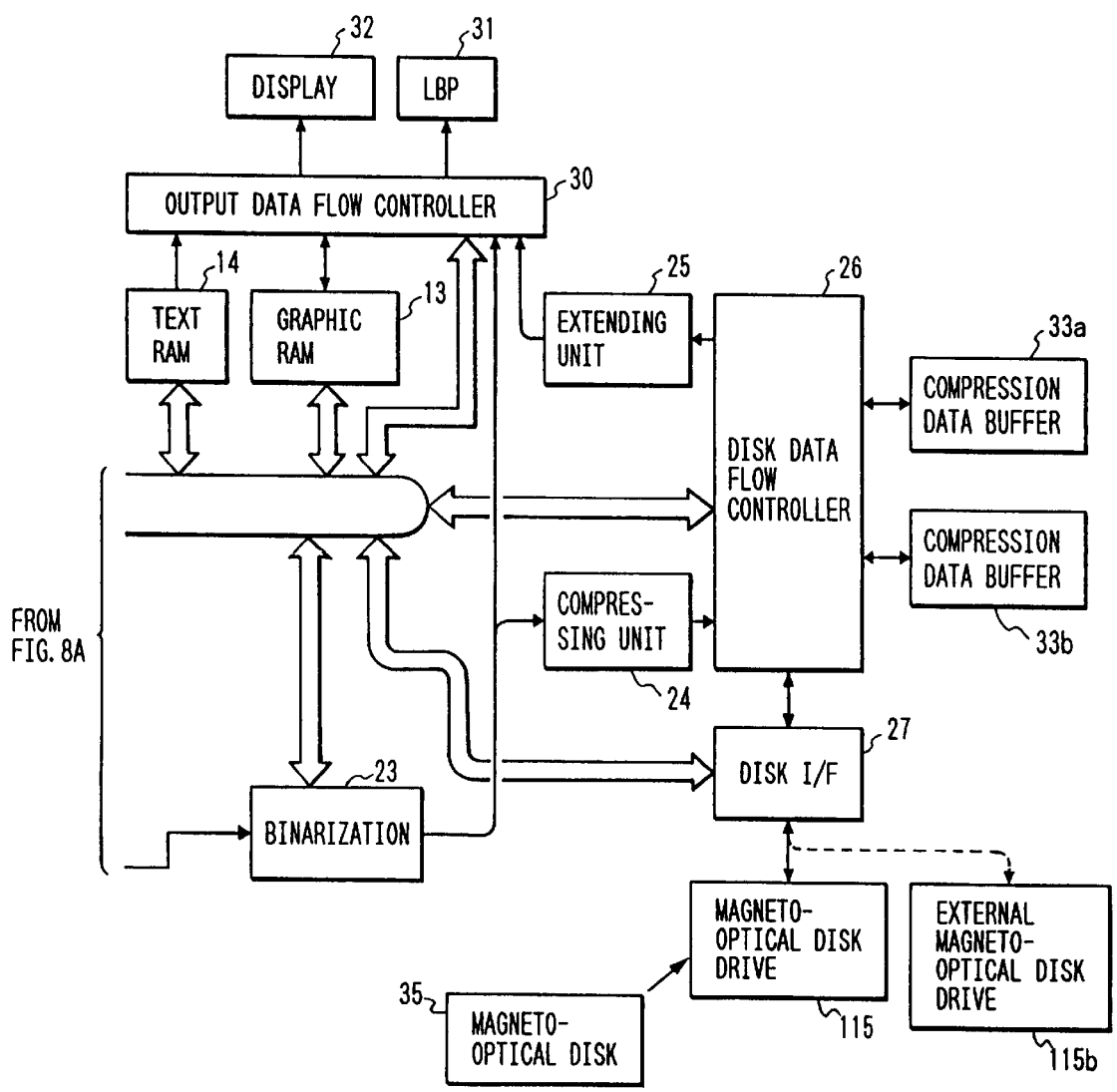
FIG. 8 is comprised of FIGS. 8A and 8B showing block diagrams of a configuration of a control unit of the image information processing apparatus.

In FIGS. 8A and 8B, a drive unit 19 comprises the sheet sensor 102 described above and a motor, not shown, and the transport is carried out by controlling the drive unit 19 by a CPU 10 through a drive unit interface 18.

Image signals derived from the front side CCD 111a and the back side CCD 111b are supplied to a combine unit 36 through amplifiers 20a and 20b, respectively.

When the combine unit 36 sends one main scan line of data from the front side CCD 111a to the succeeding stage, an internal switching device is actuated so that one main scan line of image data from the back side CCD 111b is sent to the succeeding stage.

In this manner, the front and back side image data are serialized for each main scan and it is sent to a compression unit 24.

The dual side reading has been described above. When a single side read instruction is issued to the combine unit 36 from the CPU 110, the above switching is not carried out and the image data from the front side CCD 111a is always sent to the succeeding stage.

The image signal from the combine unit 36 is quantized by an A/D conversion unit 21, image-processed such as edge emphasis by an image processing unit 22, and converted to 1/0 data by a binarization circuit 23.

The binarized image data is, on one hand, stored in a graphic RAM 13, and on the other hand compressed by the compression unit 24 by a known image information compression technique such as MH, MR or MMR and stored in one of compressed data buffers 33a and 33b.

The image data in the graphic RAM 13 is drawn on a display 32 by output data from controller 30, and the binary image data stored in the graphic RAM 13 is displayed on the display 32.

The compressed image data stored in the compressed data buffer 33a or 33b is sent to a magneto-optical disk drive 115 through a disk interface 27 and written into a magneto-optical disk 35.

The compressed data buffers 33a and 33b are provided in order to permit the scan of the next sheet while the compressed image data of the compressed data buffer 33a, for example, is being written into the magneto-optical disk 35, and storing of the compressed image data of the next sheet into the compressed data buffer 33b.

In this manner, a restriction that the scan of the next sheet should be delayed until the completion of the writing of the image data of the previous sheet is eliminated and the store rate of the sheets is improved.

The display of the image stored in the magneto-optical disk 35 is now explained.

Desired compressed image data on the magneto-optical disk 35 is specified by a procedure to be described later, and the CPU 10 binds the disk interface 27 so that the magneto-optical disk drive 115 reads the compressed image data.

The disk data flow controller 26 sends the compressed image data from the disk interface 27 to an expansion unit 25.

The output data flow controller 30 stores the image data sent from the expansion unit 25 into the RAM 13 and the image data on the graphic RAM 13 is displayed on the display 32 as it is in the image store mode. Those controls are done by the CPU 10.

In this manner, the compressed data on the magneto-optical disk 35 is displayed.

When a printout of the image is desired, the CPU 10 sends instructions to the output data flow controller 30 to send the image data on the graphic RAM 13 to an LBP (laser beam printer) 31 while the image is displayed on the display 32.

The display may be a known liquid crystal display or CRT (cathode ray tube) display, and the LBP is a laser beam printer which deposits toner on a photoconductive drum by irradiating a laser beam to the photoconductive drum and transferring the toner image to a sheet to produce a printout.

An internal operation for the store and retrieval of the image is now explained.

Prior to the store of the image of the sheet, a symbolic image (hereinafter referred to as an index image) which is related to a sheet to be stored is previously stored in the magneto-optical disk 35.

Figure 9:
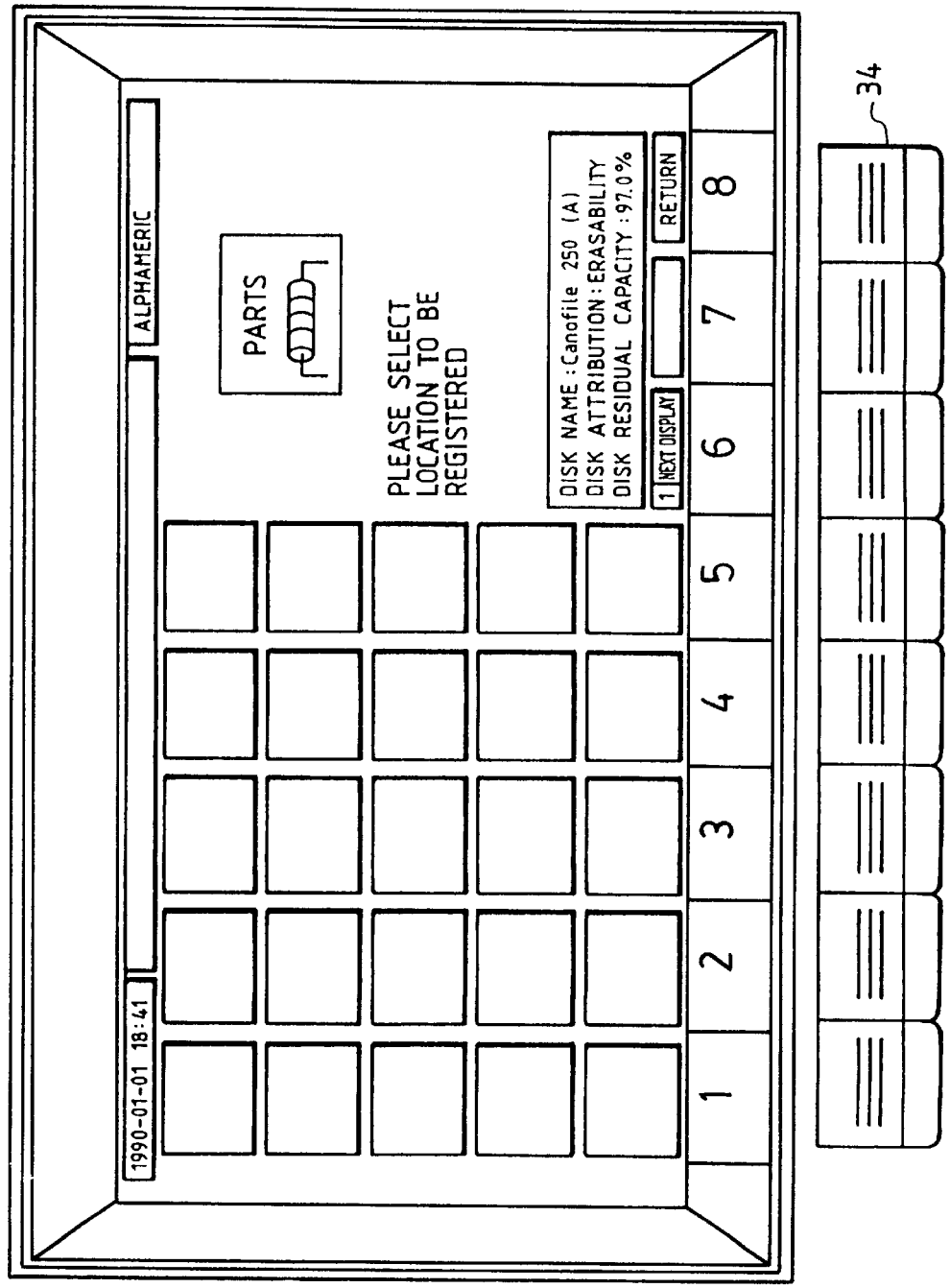
FIG. 9 shows a display screen image in the registration of the index images.

This process is carried out in the same manner as that of the store of the image of the sheet described above, and a designation is made through a function key 34 such that for each store of an index image, the index image which contains a character image of "PART" as shown in FIG. 9 is thereafter displayed at a left top in FIG. 9.

As shown in FIG. 9, the function keys 34 are arranged in one horizontal line. For example, by depressing a leftmost function key (which bears letter "1") twice, a location on the left column and second row from the top is designated.

When a plurality of index images have been stored in this manner, an index image data file is generated on the magneto-optical disk 35 as shown in FIG. 11.

Figure 10:
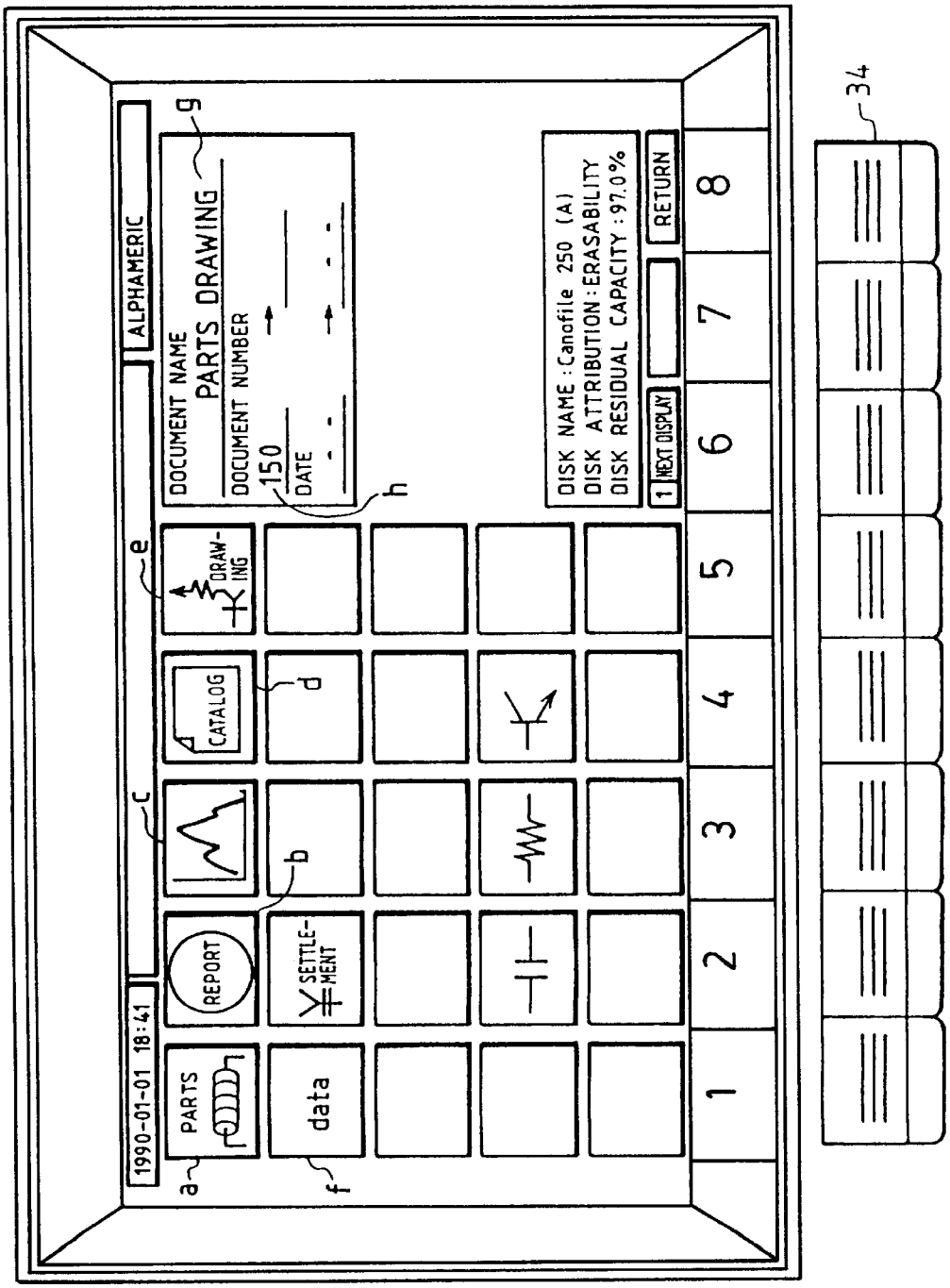
FIG. 10 shows a display screen image in the formation of an index image data file.

When the image of the sheet is to be stored, a display as shown in FIG. 10 is displayed prior to the actual store of the image of the sheet.

The operator selects an index image associated with the sheet to be stored through the function key 34. For example, when the image of the part is to be stored, the index images a and e shown in FIG. 10 are selected.

By selecting the index images a and e, an image index pattern having "1" set at the bit positions corresponding to the selected index images is generated as shown in FIG. 11.

Numbers which may be of help in the subsequent retrieval such as a key word or key number of the sheet to be stored may be entered in columns g and h of FIG. 10 through the keyboard 7.

When the image index pattern and the key word or the key number have been entered, the store of the image of the sheet is carried out.

When the store of the sheet has been completed, a record of the stored document is generated in a document management file on the magneto-optical disk 35, as shown in FIG. 12A.

For example, as to the "PART" drawing, a record which contains "100010 . . . " corresponding to the image index pattern, "PART DRAWING" corresponding to the key word and "150" corresponding to the key number is generated in a second column of FIG. 11.

In addition, date prepared (date stored) derived from a clock unit 15 of FIG. 8A and a total number of pages are recorded.

The information on each page of the stored document is stored in the page management file of FIG. 12B, and a page pointer in the document management file indicates a record number in the page management file which relates to the first page of the stored document.

The page record also contains information on the front/back side mode, that is, whether the page was read in the dual side mode or the single side mode.

In the present embodiment, the position of the image data on the magneto-optical disk 35, that is, on the compressed image data disk is managed by having a data table called a mode table as shown in FIG. 12C on the magneto-optical disk 35.

Figures 13, 14:
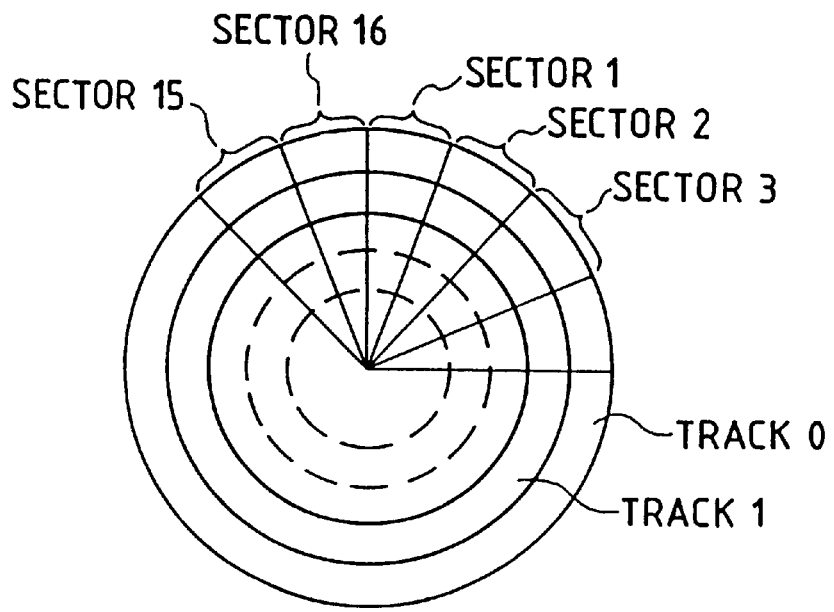
FIG. 13 shows a storage area in a magnetooptical disk medium.
FIG. 14 shows a relationship between a logical address and a physical address.

The FAT entry in FIG. 12C is now explained. FIG. 13 shows a storage area in the medium of the magneto-optical disk 35.

In such a disk, the medium is sectioned by physical sections called tracks and sectors as shown. The position information of such physical sections are hereinafter referred to as physical addresses.

The magneto-optical disk drive 115 receives a designation of an area to store or read information by a physical address through an external unit, and in a CPU unit which is usually a control unit, it is managed by a logical area section called a cluster. The position information of the logical area section is hereinafter referred to as a logical address.

A relationship between the logical address and the physical address is uniquely defined in such a system as shown in FIG. 14 and the designation of a logical address is equivalent to the designation of a physical address.

A list of unused/use/deleted is stored in an area of a fixed physical address on the medium which is specified by the logical address.

In the present embodiment, FFFF is written when the cluster is unused, FFFE is written for the deleted status, 0000 is written when the cluster is the last cluster of the file, and a logical address of a continuing cluster is written when the cluster is the continuing cluster.

A difference between the deletion and the unused state is that in the unused state there is no significant information at an address designated by the logical address and the deletion appears after the deletion of a file and information is still present at the address designated by the logical address. The management table is usually called a FAT (file allocation table). It is shown in FIG. 15.

An upper row of FIG. 15 represents logical addresses and a lower row represents an unused, a used or a deleted state of the logical address.

FIG. 15 indicates that the logical addresses 62B0–62BA are used and 62BB et seq are unused.

It also shows that 62AD–62AF have been a portion of a valid file but they are later deleted.

The node table comprises a FAT entry (62B0 in the present example) for indicating the position in the FAT which corresponds to the compressed image file of that page, and a size (number of bytes) of the compressed image data to form one record. The row position of the record in the node table is referred to as a "node" and it is written in the page management file of FIG. 12B for each page.

In the store operation of the image of the sheet, the compressed image data is written onto the magneto-optical disk 35 and the respective records are added to the node table, the page management file and the document management file.

An internal operation in the retrieval of the image is now explained.

In the retrieval mode, a display similar to that of FIG. 10 is displayed on the display 32 and the operator selects the image index through the function key 34, or enters a key word or key number to the areas g and h of FIG. 10 through the keyboard 7.

The CPU 10 then examines the document management file record by record to select the record which matches to the input image index pattern, key word or key number.

When the selected image index is only an image index a which contains the character image "PART" of FIG. 10, the image index pattern is different from that shown in FIG. 11 because the image index which contains the character image "DRAWING" is not selected, and the bit corresponding to e is "0".

However, when the records of the document management file of FIG. 12A are examined, all records having "1" set at the same positions of the "1" bits in the input image index pattern in the retrieval mode are selected. Accordingly, in the illustrated example, "PART CATALOG" in the first row of FIG. 12A, "PART DRAWING" in the second row and "PART DRAWING" in the fourth row are selected.

If "150" is entered as the key number, only "PART DRAWING" in the second row is selected, and if "PART DRAWING" is entered as the key word, "PART DRAWING" in the second row and "PART DRAWING" in the fourth row are selected.

When a plurality of documents are retrieved, a list of the documents are displayed on the display 32 and one of them is selected by the operator through the keyboard 7.

When one document is finally selected, a record of the first page of the document is selected from the page management file of FIG. 12B by a page file pointer of the record, and when the node is specified, a FAT entry of the first page is acquired from the node table.

By tracking the FAT of FIG. 15, a logical address train is produced and the compressed image data is sequentially read from the disk drive 115 and the image of the first page is displayed on the display 32 through the data path described above.

The retrieved and selected data may be sent to the LBP 31 for printing it out.

The deletion of the image information stored in the magneto-optical disk 35 is now explained.

When the document is to be deleted after the retrieval of the image, it is instructed to the CPU 10 through the keyboard 7.

As a result "0" is stored in the "delete" item of the document management file of FIG. 12A which heretofore has stored "1".

Similarly, "0" is stored in the "delete" item of the page management file of FIG. 12B.

By tracking the node, the FAT corresponding to the clusters of pages contained in the document is changed from the used state (that is, the logical address of the next cluster is stored) to the delete state.

Since the deletion does not update the image data having a very large information quantity, the deletion operation is rapidly completed.

A condense operation is now explained.

As seen from FIG. 15, in the store operation of the image, the wiring of the compressed image data is conducted for the cluster having consecutive logical addresses in order to attain a high speed store operation.

As the store operation is continued, the unused cluster having the consecutive logical addresses is exhausted. But, since the deletion may have been conducted, the deleted cluster, for example, areas 62AD–62AF in FIG. 15 are moved out so that new consecutive logical addresses are provided.

The move-out operation is called a condense operation.

In the condense operation, the FAT, for example, the area 62AD–62BA in FIG. 15 is moved to the area starting from 62AD and the deleted cluster in the area 62AD–62AF is moved out.

In the example of FIG. 15, the right unused area is expanded to the left by the length of the move-out.

As the cluster is moved, the FAT entry of the node table of FIG. 12C is updated.

For the document management file of FIG. 12A and the page management file of FIG. 12B, the records having a "0" delete item are moved out and the page file pointer is updated to comply with the moved-out page management file. In this manner, the condense operation is carried out.

The group index registration is now explained.

The generation of the group index registration form is first explained.

Figure 1:
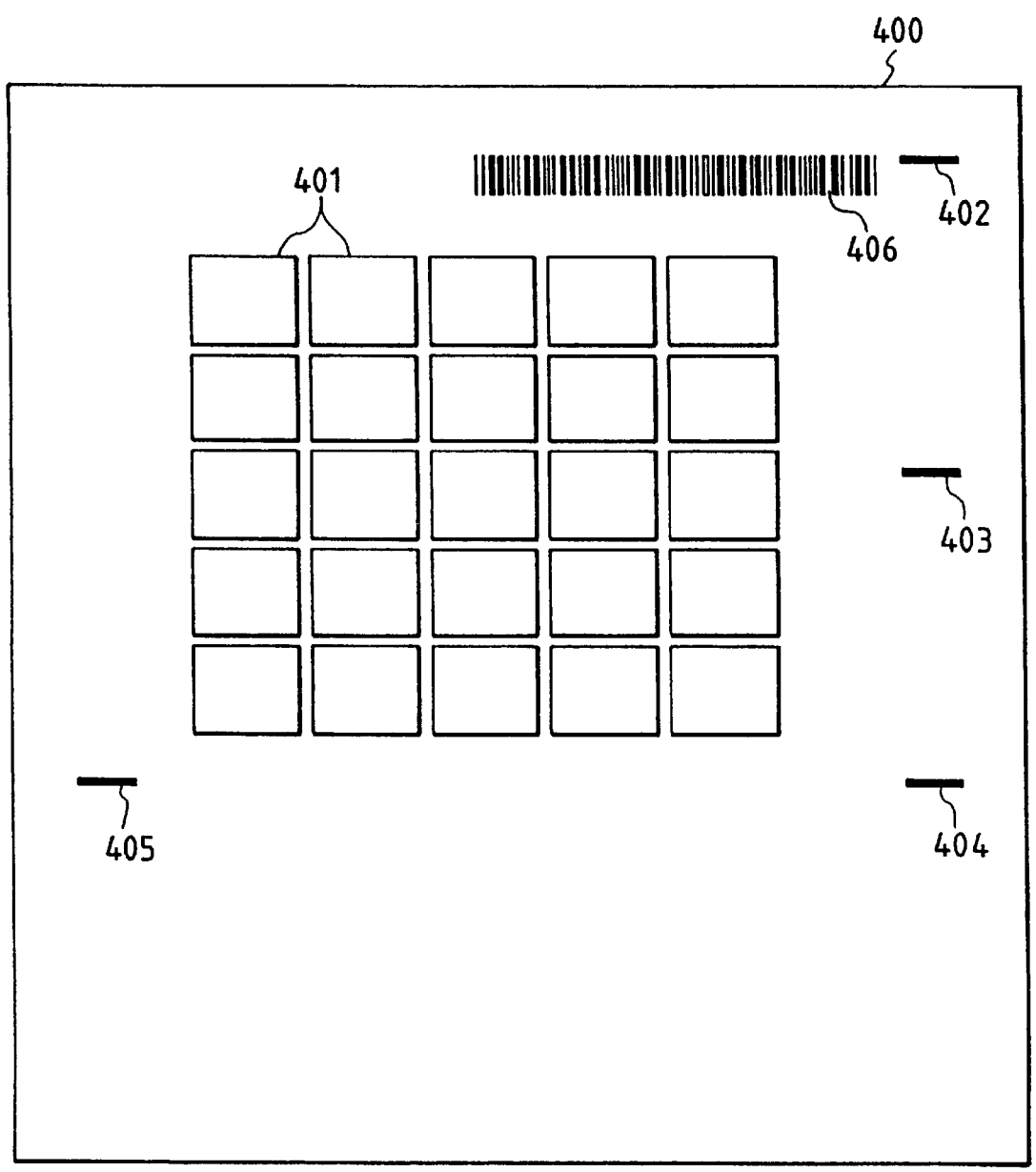
FIG. 1 shows an example of a group index registration form in a first embodiment.

FIG. 1 shows an example of the group index registration form used in the present embodiment. The group index registration form is generated in the following process.

First, an area to generate the group index registration form is secured in the graphic RAM 13. Frames 401 indicating areas for the index image data to be registered are then developed on the graphic RAM 13.

In the group index registration form shown in FIG. 1, 25 frames indicating the index registration areas are provided because 25 indices per page are displayed on the index display screen of the image information processing apparatus of the present embodiment as shown in FIG. 9, although the number of registrations of indices is not limited to 25 and it may be varied in accordance with the configuration of the image information processing apparatus.

Reference marks 402–405 used as reference positions to read the image positions of the indices and a bar code 406 indicating a sheet type are then sequentially developed in an area of the graphic RAM 13. In the group index registration form 400 used in the present embodiment, the bar code is used to collate the sheet type although other image patterns, punched holes or a magnetic stripe which allows the machine reading of the sheet type may be used instead of the bar code.

When the generation of the image data for the group index registration form on the graphic RAM 13 is completed, the CPU 10 sends instructions to the output data flow controller 30 to send the image data on the graphic RAM 13 to the LBP 31 so that the group index registration form is printed out.

The registration of the index images by the printed group index registration form of FIG. 1 is now explained.

Figure 2:
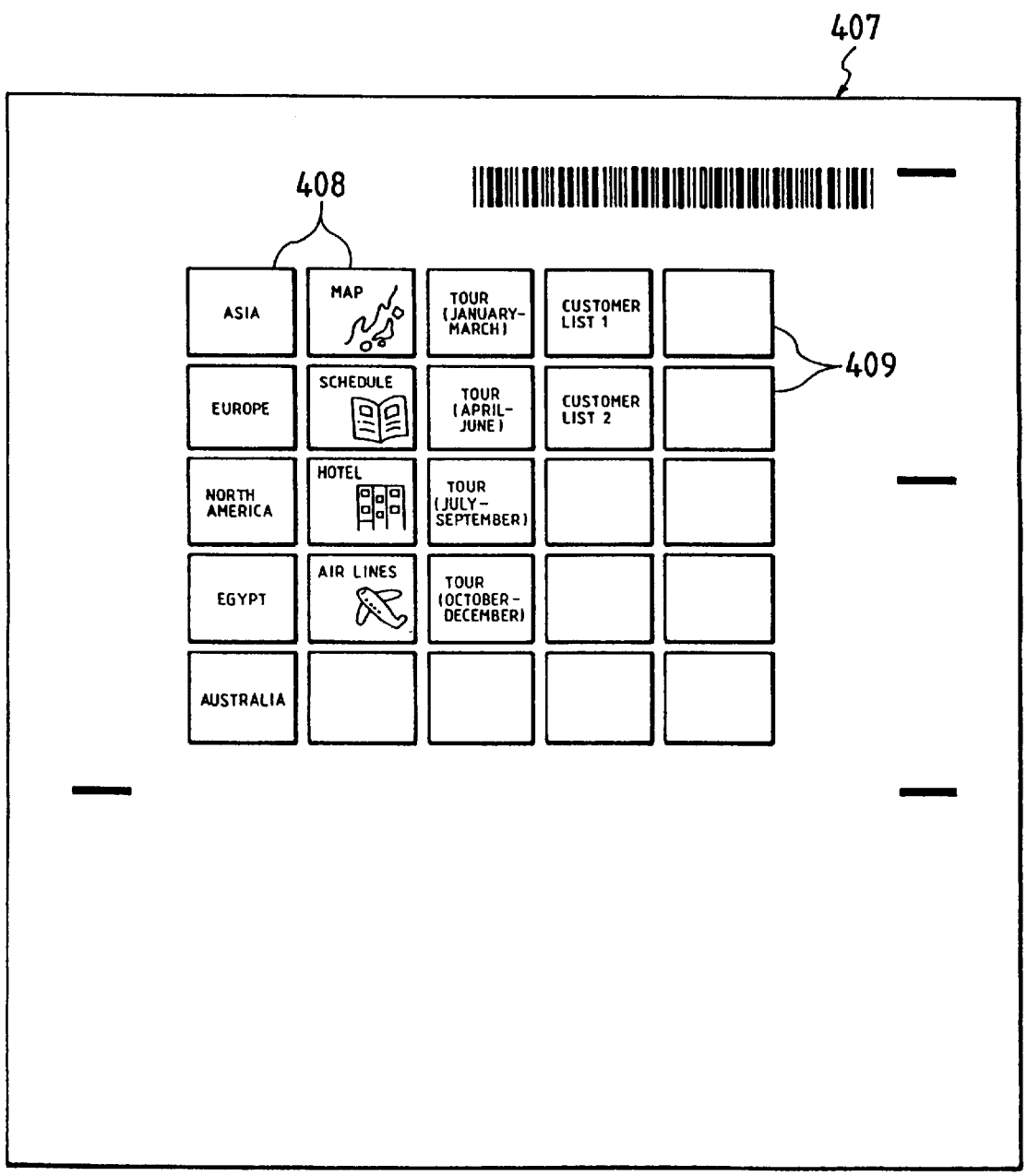
FIG. 2 shows a state of entry of index images on the group index registration form shown in FIG. 1.

When the index images are to be registered, the operator first draws images in the frames 408 indicating the index areas on the generated group index registration form as shown in FIG. 2. As shown in FIG. 2, no image is drawn in the frames 409 which are not to be registered. The group index registration form is then scanned by the image information processing apparatus. The scan operation is conducted in the same manner as that in the store operation of the image of the sheet except that the group index registration form is not directly written into the magneto-optical disk 35 but only those images which are developed on the graphic RAM 13 and determined to be the index images are written into the magneto-optical disk 35 as the index image data.

The group index registration operation is now explained in sequence.

(1) Collation of the group index registration form

For the image data developed on the graphic RAM 13, the sheet type is collated by the bar code.

(2) When the form is determined to be the group index registration form by the collation (1), the coordinate positions of all reference marks 402–404 are determined on the graphic RAM 13 for the image data of the group index registration form developed on the graphic RAM 13 to determine the coordinate positions of the index image areas (frames) on the graphic RAM 13. The positions of the image areas (frames) are previously determined for each sheet type.

The presence or absence of the index image in each of the areas (frames) is determined. This is carried out by counting the number of pixels in the registration area of each index image developed on the graphic RAM 13. If the number of pixels counted is larger than a predetermined number which allows a determination that it is not due to spots on the sheet but due to the image, it is determined that an image is present in that area. If the number of pixels is smaller than the predetermined number, it is determined that the index image is not present in that area.

(3) When the index image is to be newly registered, that is, when the index image corresponding to the index image area to be processed has not been registered on the magneto-optical disk 35, the index image data is stored in the magneto-optical disk 35 for only those which have been determined that the index images are present in the index image areas of the group index registration form by the step (2).

(4) When the index image is to be updated, that is, when the index image corresponding to the index image area to be processed has already been registered in the magneto-optical disk, the existing index image data is deleted for only those indices which have been determined that the images are present in the index areas to be processed in the step (2), and the index images by the group index registration are stored in the magneto-optical disk 35 as the new index image data. When all bits of the image index pattern in the document management file as shown in FIG. 12A which correspond to the registered index image data are left as they are, only the index image data is updated.

When the bits of the image index pattern in the document management file which correspond to the registered index image data are set to "0", the correspondence relation between the index image data at the specified positions and the document management file may be deleted. Whether to maintain or update the document management file may be previously set through the keyboard 7.

(5) When it is determined that the image is not present in the index image area to be processed in the step (2) and the index image data has already been registered in the registration position, the existing index image data is left as it is and the bits in the document management file are left as they are.

When it is determined that the image is not present in the index image area to be processed in the step (2) and the index image data has already been registered in the registration position corresponding to that area, the existing index data is deleted and the bits of the image index pattern in the document management file which correspond to the registered index image data are set to "0" to delete the index image data at the specified registration positions, and the correspondence relation between the index image data at the specified registration positions and the document management file may be deleted.

Figure 3:
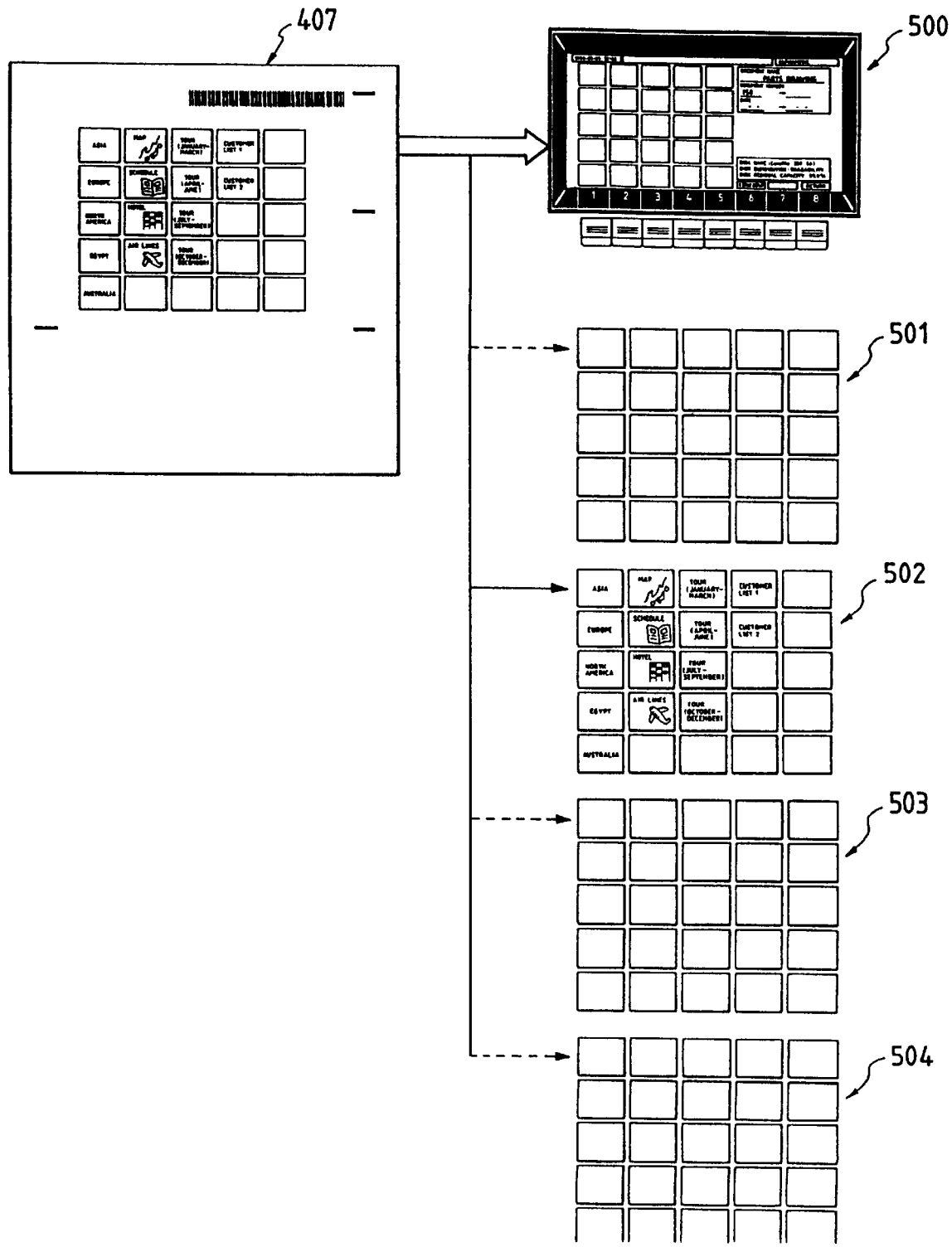
FIG. 3 shows a configuration of the index images in an image information processing apparatus.

In the above process, as shown in FIG. 3, the group registration of the index images is carried out for the index screen 502 of the second page, of the index screens 501–504 of the first page to fourth page of the image information processing apparatus.

After the registration of the index images, the documents are stored and retrieved, and the registration of the index images may be carried out after the storage of the documents.

A second embodiment of the present invention is now explained.

In the second embodiment, an analysis program for the group index registration is newly added to the ROM 11, and the CCD's 111a and 111b are for reading color images. Other constructions and the operations of storing the image information, displaying the stored image and printing the image are the same as those described above and the explanation thereof is omitted. In the following description, identical elements are designated by identical numerals.

The group index image registration in the second embodiment is now explained.

Figure 4A:
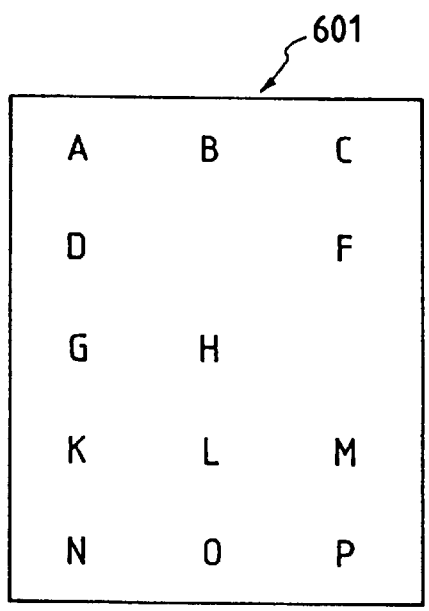
FIGS. 4A and 4B show an image of a sheet to be used as a group index registration form in a second embodiment and a state of entry of border lines on the sheet by color pens.
Figure 4B:
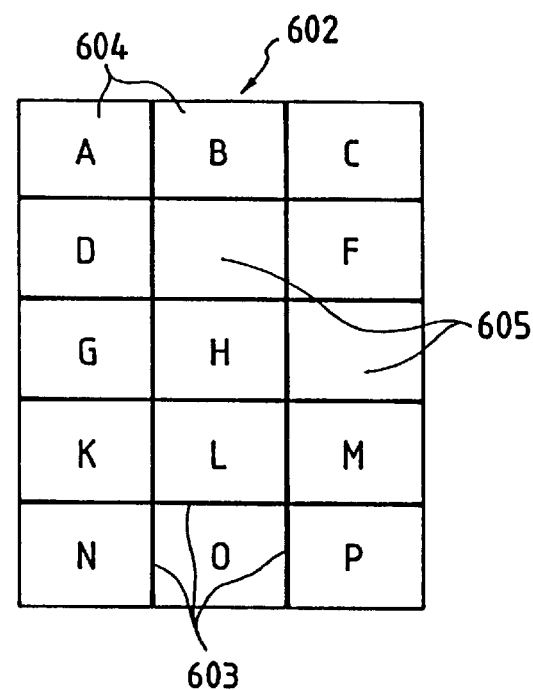

Border lines 603 are drawn on the image sheet 60 shown in FIG. 4A for the registration of the index images to divide it into a plurality of areas 602 as shown in FIG. 4B. The prepared image sheet is stored in the same manner as it was for the image of the sheet.

In the present embodiment, since the CCD 111a is for color operation, the border lines by the color pens used to divide the image on the sheet developed on the graphic RAM 13 have a different bit pattern than that of the conventional black and white image. Thus, the bit pattern of the border lines by the color pens can be detected from the image of the sheet scanned and developed on the graphic RAM 13 and the image of the sheet may be divided into a plurality of images.

For each of the index image areas generated, the number of pixels developed on the graphic RAM 13 is counted. If the number of pixels is larger than the predetermined number which allows a determination that it is due to the image, it is determined that it is the area 604 in which the index image is present and it is registered as the index image. If the number of pixels is smaller than the predetermined number, it is determined that it is the area 605 in which the index image is not present, and it is not registered.

In this manner, the entire sheet 604 is collectively stored into the magneto-optical disk 35 as the index image data in one scan.

After the index image has been entered, the store and retrieval operation described above is carried out.

A third embodiment of the present invention is now explained.

In the third embodiment, an analysis program for the group index registration is newly added to the ROM 11. Other constructions and the operations of storing the image information, displaying the stored information and printing the image are the same as those described above and the explanation thereof is omitted. In following description, the identical numerals are used.

The group index image registration in the third embodiment is now explained.

Figure 5A:
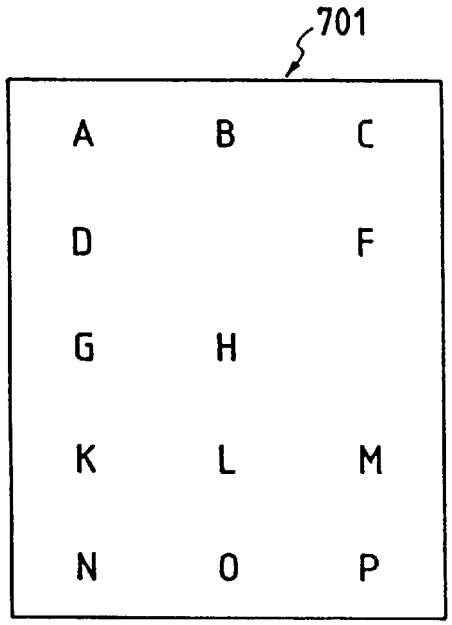
FIGS. 5A, 5B and 5C show an image of a sheet to be used as a group index registration form in a third embodiment, a state of entry of border lines on a back side of the sheet and a state of division of a front side image read by dual side reading, by the border lines on the back side.
Figure 5B:
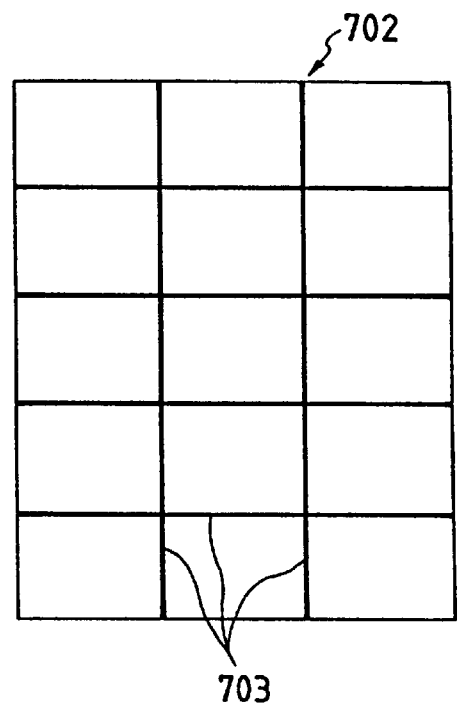
Figure 5C:
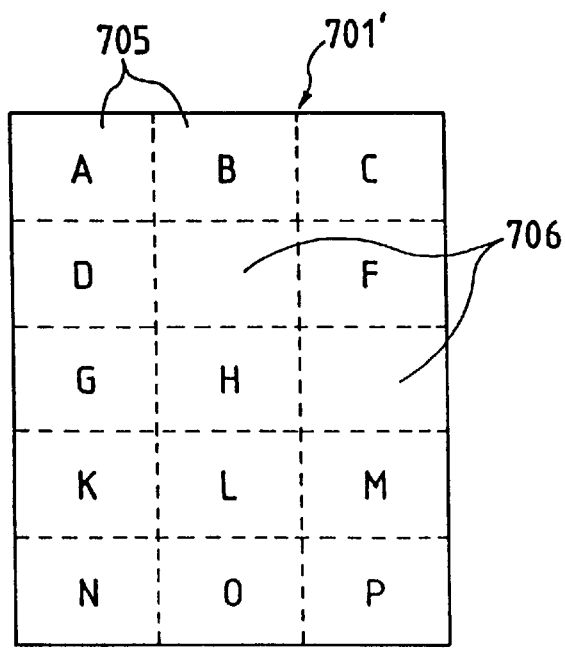

As shown in FIGS. 5A and 5B, border lines 703 are drawn on a back side of an image sheet 701 to be registered as the index images, and the images on both sides are read by the CCD 111a and the CCD 111b in the scan by the image information processing apparatus.

From the image data of both sides developed on the graphic RAM 13, the border lines 703 on the back side 702 which correspond to the image 701 of the sheet are detected, and the image data on the front side 701 is divided into a plurality of images based on the border lines 703.

For each of the index image areas generated, the number of pixels developed on the graphic RAM 13 is counted, and if the number of pixels is larger than the predetermined number, it is determined that it is the area 705 in which the index image is present, and it is registered. If the number of pixels is smaller than the predetermined number, it is determined that it is the area 706 in which the index image is not present, and it is not registered. In this manner, all index images 705 are collectively stored in the magneto-optical disk 35 in one scan. After the image index pattern has been entered, the store and retrieval operation described above is carried out.

As described above, by using the group index registration in the registration of the index images, the new registration and the updating of the index images can be collectively carried out. Accordingly, the operability of the new registration, additional registration and updating of the retrieved images in the image information processing apparatus are improved.

What is claimed is:

1. Image retrieval apparatus for retrieving a retrieving target image stored in a fixed disk storage medium comprising:

a display for displaying an array of index images stored in the fixed disk storage medium when in a target image storing mode;

a selector for selecting a set of stored index images from the displayed array and assigning key data for each of plural target images to be stored;

a first table generator for generating a first table having a document management entry for each target image, each entry including data identifying the set of displayed index images selected for the target image, the assigned key data for the target image and a page pointer for the target image;

a second table generator for generating a second table having a page management entry for each target image, each entry including data identifying the pages of the target image as addressed by the page pointer and a node pointer;

a third table generator for generating a third table having a node entry for each target image, each entry including data representative of the size of the target image and data representative of the fixed disk storage medium locations of the target image in a storing mode;

a control for storing the target image in the fixed disk storage medium responsive to the entries of the first, second and third tables for the target image;

the selector selecting a set of index images and key data of a target image to be retrieved from the index image array display when in a target image retrieving mode;

a control for determining the entries in the first, second and third tables for the target image to be retrieved by comparing the set of index images and key data selected for retrieval to the index images and key data of the entries of the first table; and a retrieving unit for retrieving the target image to be retrieved from the fixed disk storage medium responsive to the determined entries in the first, second and third tables, wherein each first table entry and second table entry includes a status code and selection of a target image is deleted by inserting a delete code into the entry for the target image in the first table and the second table to remove selection of the target image;

read means for reading an array of index images on a sheet arranged in positions of the array on the display; and means for selectively registering index images read by said read means with respect to the displayed index images in corresponding positions of the array.

2. An image retrieving apparatus according to claim 1, further comprising discrimination means that discriminates when an index image is present in a predetermined area of the sheet and that an index image corresponding to that area has already been registered by said registration means, said registration means being responsive to the discrimination by updating the index image with the index image from said read means and invalidating a correspondence relation between the index image and the retrieving target image.

3. An image retrieving apparatus according to claim 1, further comprising discrimination means that discriminates when an index image is not present in a predetermined area of the sheet and an that an index image corresponding to that area has already been registered by said registration means, said registration means being responsive to the discrimination by maintaining a correspondence relation between the index image and the retrieving target image.

4. An image retrieving apparatus according to claim 1, further comprising discrimination means that discriminates when an index image is not present in a predetermined area of the sheet and that an index image corresponding to that area has already been registered by said registration means, said registration means being responsive to the discrimination by invalidating a correspondence relation between the index image and the retrieving target image.

5. An image retrieving method for retrieving a retrieving target image stored in a storage medium comprising:

displaying an array of index images stored in the fixed disk storage medium when in a target image storing mode;

selecting a set of stored index images from the displayed array and assigning key data for each of plural target images to be stored;

generating a first table having a document management entry for each target image, each entry including data identifying the set of displayed index images selected for the target image, the assigned key data for the target image and a page pointer for the target image;

generating a second table having a page management entry for each target image, each entry including data identifying the pages of the target image as addressed by the page pointer and a node pointer;

generating a third table having a node entry for each target image, each entry including data representative of the size of the target image and data representative of the fixed disk storage medium locations of the target image in a storing mode;

storing the target image in the fixed disk storage medium responsive to the entries of the first, second and third tables for the target image;

selecting a set of index images and key data of a target image to be retrieved from the index image array display when in a target image retrieving mode;

determining the entries in the first, second and third tables for the target image to be retrieved by comparing the set of index images and key data selected for retrieval to the index images and key data of the entries of the first table; and retrieving the target image to be retrieved from the fixed disk storage medium responsive to the determined entries in the first, second and third tables, wherein each first table entry and second table entry includes a status code and selection of a target image is deleted by inserting a delete code into the entry for the target image in the first table and the second table to remove selection of the target image;

reading an array of index images on a sheet arranged in positions of the array on the display; and selectively registering index images read by said read means with respect to the displayed index images in corresponding positions of the array.

6. An image retrieving method according to claim 5, further comprising the step of discriminating when an index image is present in a predetermined area and that an index image corresponding to that area has already been registered in said registering step, said registering step being responsive to the discrimination by updating the index image with the index image from said reading step and maintaining a correspondence relation between the index image and the retrieving target image.

7. An image retrieving method according to claim 5, further comprising the step of discriminating when an index image is present in a predetermined area and that an index image corresponding to that area has already been registered in said registering step, said registering step being responsive to the discrimination by updating the index image with the index image from said reading step and invalidating a correspondence relation between the index image and the retrieving target image.

8. An image retrieving method according to claim 5, further comprising discriminating when an index image is not present in a predetermined area and an index image corresponding to that area has already been registered in said registering step, said registering step being responsive to the discrimination by maintaining a correspondence relation between the index image and the retrieving target image.

9. An image retrieving method according to claim 5, further comprising the step of discriminating when an index image is not present in a predetermined area and an index image corresponding to that area has already been registered in said registering step, said registering step being responsive to the discrimination by invalidating a correspondence relation between the index image and the retrieving target image.

* * * * *

UNITED STATES PATENT AND TRADEMARK OFFICE
CERTIFICATE OF CORRECTION

PATENT NO.  : 5,933,548
DATED       : August 3, 1999
INVENTOR(S) : AKIRA MORISAWA It is certified that error appears in the above-identified patent and that said Letters Patent is hereby corrected as shown below:

COLUMN 5

Line 49, "a" should be deleted.

COLUMN 7

Line 45, "form" should read --form:--.

COLUMN 10

Line 61, "an" (first occurrence) should be deleted.

Signed and Sealed this

Eleventh Day of April, 2000

Attest:

Attesting Officer

Q. TODD DICKINSON

Director of Patents and Trademarks